(12) United States Patent
De Bree

(10) Patent No.: US 9,351,446 B2
(45) Date of Patent: *May 31, 2016

(54) SWEEPING MACHINE FOR WORKING GROUND SURFACES, IN PARTICULAR LAWNS

(71) Applicant: Redexim Handel-En Exploitatie Maatschappij B.V., Zeist (NL)

(72) Inventor: Cornelius Hermanus Maria De Bree, Zeist (NL)

(73) Assignee: Redexim Handel- En Exploitatie Maatschappij B.V., Zeist (NL)

( * ) Notice: Subject to any disclaimer, the term of this patent is extended or adjusted under 35 U.S.C. 154(b) by 340 days.

This patent is subject to a terminal disclaimer.

(21) Appl. No.: 13/750,447

(22) Filed: Jan. 25, 2013

(65) Prior Publication Data
US 2014/0123412 A1     May 8, 2014

(30) Foreign Application Priority Data

Nov. 5, 2012 (DE) .......................... 20 2012 010 494

(51) Int. Cl.
    *E01H 1/05*     (2006.01)
    *A01G 1/12*     (2006.01)

(52) U.S. Cl.
    CPC ................ *A01G 1/125* (2013.01); *E01H 1/056* (2013.01); *Y10T 29/49826* (2015.01)

(58) Field of Classification Search
    USPC ............................. 15/52.1, 79.1, 79.2, 82, 83
    See application file for complete search history.

(56) References Cited

U.S. PATENT DOCUMENTS

| | | | | |
|---|---|---|---|---|
| 220,252 | A | | 10/1879 | O'Neill |
| 445,219 | A | * | 1/1891 | Briggs ............................... 15/55 |
| 478,942 | A | * | 7/1892 | Pease ................................. 15/83 |
| 536,637 | A | * | 4/1895 | Lucas ............................... 15/55 |
| 612,632 | A | * | 10/1898 | Pitman et al. ..................... 15/83 |
| 644,739 | A | * | 3/1900 | Greeley et al. ..................... 15/82 |
| 683,719 | A | * | 10/1901 | Amrein ............................. 15/82 |
| 802,682 | A | * | 10/1905 | Collyer ............................. 15/83 |

(Continued)

FOREIGN PATENT DOCUMENTS

| | | |
|---|---|---|
| DE | 35 17 079 C2 | 11/1986 |
| DE | 270 941 A1 | 8/1989 |
| FR | 344 579 A | 11/1904 |

OTHER PUBLICATIONS

International Search Report dated Jun. 5, 2014 in corresponding International Application No. PCT/EP2013/073039, 2 pgs.

*Primary Examiner* — Mark Spisich
(74) *Attorney, Agent, or Firm* — Maier & Maier, PLLC

(57) ABSTRACT

A sweeping machine for working ground surfaces, including a machine frame adapted to be moved in the traveling direction, at least one wheel axle with at least one wheel, the wheel axle being supported in the machine frame transversely to the traveling direction. The wheel axle supports the machine frame parallel to the ground surface, at least one sweeping element may be driven for rotation about a sweeping element axis, the sweeping element axis extending substantially parallel to the ground surface, and the sweeping element is in contact with the ground surface when in an operating position. The sweeping element axis may be moved from a first operating position, assumed when travelling straight, to a second operating position, assumed when driving a curve. In the second position the sweeping element axis is in a position pivoted towards the inner side of the curve.

19 Claims, 4 Drawing Sheets

(56) References Cited

U.S. PATENT DOCUMENTS

Figure 1:
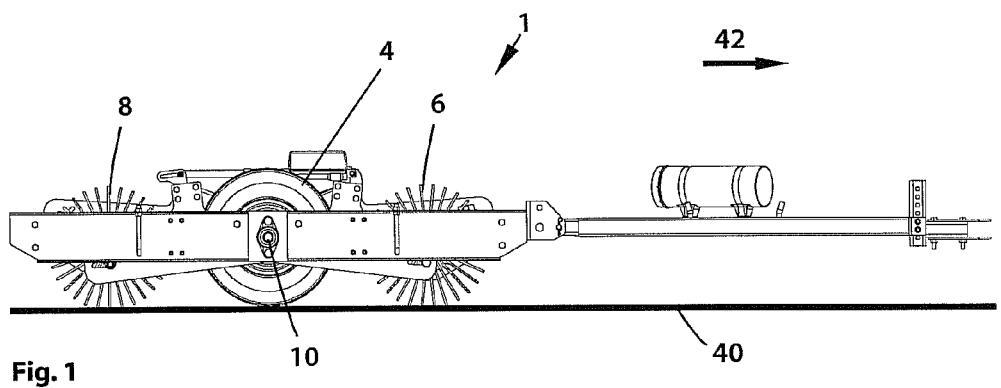

| | | | |
|---|---|---|---|
| 965,245 A * | 7/1910 | Spicer | 15/79.1 |
| 982,570 A * | 1/1911 | Brooks | 15/83 |
| 1,892,961 A * | 1/1933 | Parker | 15/83 |
| 1,904,881 A * | 4/1933 | Presbrey | 15/82 |
| 2,145,738 A * | 1/1939 | Sandberg | 15/79.1 |
| 2,158,967 A | 5/1939 | Hilliard | |
| 2,259,632 A | 10/1941 | Grace | |
| 2,259,724 A * | 10/1941 | Bartholow | 15/82 |
| 2,732,573 A | 1/1956 | Hyland | |
| 4,001,908 A * | 1/1977 | Franklin | 15/83 |
| 4,366,593 A * | 1/1983 | Parikh | 15/52.1 |
| 5,483,718 A * | 1/1996 | Blehert et al. | 15/50.3 |
| 6,212,731 B1 * | 4/2001 | Eckerlein et al. | 15/320 |
| 7,540,053 B2 * | 6/2009 | Heitfield | 15/82 |
| 2009/0293213 A1 | 12/2009 | Heitfield | |

\* cited by examiner

SWEEPING MACHINE FOR WORKING GROUND SURFACES, IN PARTICULAR LAWNS

RELATED APPLICATIONS

This application claims priority under 35 USC. §119 to German Patent Application No, 20 2012 010 494.2, filed Nov. 5, 2012, the disclosure of which is incorporated by reference herein in its entirety.

The invention refers to a sweeping machine for working ground surfaces.

Sweeping machines for working ground surfaces are known that comprise a machine frame adapted to be moved in the traveling direction, in which machine frame at least one wheel axle with at least one wheel is supported transversely to the traveling direction, the wheel axle carrying the machine frame parallel to the ground surface. The sweeping machine has at least one sweeping element adapted to be rotated about a sweeping element axis, with the sweeping element axis extending parallel to the ground surface and the sweeping element being in contact with the ground surface when in an operating position.

However, these sweeping machines have a drawback in that, in particular when driving curves, the sweepings such as leaves or sand are transported towards the outer edge of the curve and are transported out from the sweeping machine at the outer edge of the curve. Further, there is a need to provide sweeping machines that can be manufactured as economically as possible and as simply as possible, which sweepers can be transported to the site to be swept in a transport position in which the sweeping element does not touch the ground surface, and wherein the sweeping element is driven only when it is in contact with the ground surface.

It is thus an object of the present invention to provide a sweeping machine configured such that the material to be swept is not transported out from the sweeping machine even when driving a curve.

It is another object of the present invention to provide a sweeping machine that is economic and simple to manufacture, the sweeping element of the sweeping machine being driven only when in contact with the ground.

These objects are achieved with the features of the present invention.

The invention advantageously provides that the sweeping element axis of the at least one sweeping element is adapted to be shifted from a first operating position, assumed when traveling in a straight direction, to a second operating position, assumed when driving curves, the sweeping element axis in the second position being pivoted towards the inner side of the curve with respect to the first operating position.

This is advantageous in that the material to be swept is prevented from being transported towards the outer side of the curve, e.g. by centrifugal forces, and from being transported out from the sweeping machine.

The sweeping element axis may be pivotable from the first operating position to the second operating position about a substantially vertical pivot axis.

The sweeping element may be a brush roller, preferably a round brush roller.

The vertical pivot axis may extend through a bearing at one of the free ends of the sweeping element axis.

A single wheel axle may be provided that is supported in the machine frame.

The at least one wheel axle may drive the at least one sweeping element and/or a transmission.

The machine frame may comprise a coupling device for a towing vehicle.

At least two sweeping elements may be provided, with one sweeping element preferably being arranged ahead of the wheel axle, seen in the direction of travel, and one sweeping element being arranged behind the wheel axle, seen in the traveling direction.

In the first operating position, the sweeping element axis of the at least one sweeping element may be arranged in parallel with the at least one wheel axle.

In the second operating position, the sweeping element axis is preferably no arranged in parallel with the wheel axle.

The sweeping element axis of the at least one sweeping element may be pivotable substantially in a plane parallel to the ground surface.

The sweeping element axis of the at least one sweeping element may comprise a first and a second end, at least one end being adjustable with respect to the machine frame by means of an adjusting means in order to pivot the sweeping element axis.

The adjusting means may be manually and/or pneumatically and/or hydraulically actuatable.

When driving curves, the outer end of the at least one sweeping element may be pivotable in a forward direction with respect to the frame, seen in the traveling direction, and/or the end on the inner side of the curve of the at least one sweeping element may be adjustable in a rearward direction with respect to the frame.

The adjusting means for the at least one sweeping element axis may be controllable in an automatic manner depending on the steering angle of the towing vehicle or on a curve travel detector signal from a detector provided on the machine frame.

The at least one sweeping element axis may be supported in an inner frame element of the machine frame, which is vertically adjustable with respect to the machine frame such that the sweeping element can be moved to a transport position in which the sweeping element is not in contact with the ground surface.

The inner frame element may be pivotable with respect to the machine frame about an axis parallel to the wheel axle or about the wheel axle.

In the operating position, the at least one sweeping element may be drivingly coupled with the wheel axle via a transmission, in particular a belt drive or a chain drive, while in the transport position, the sweeping element may be adapted to be uncoupled from the wheel axle by means of a clutch, for example.

The invention further advantageously provides a method for sweeping ground surfaces, in particular lawns, wherein a vehicle moves a sweeping machine in the traveling direction, wherein the sweeping machine is supported by at least one wheel on a wheel axle of the sweeping machine that extends transversely to the traveling direction, and wherein the ground surface is swept with at least one sweeping element extending substantially parallel to the wheel axle and driven to rotate about a sweeping element axis. The sweeping element is pivoted from a first operating position for straight travel, in which position the sweeping element axis of the sweeping element is in a substantially orthogonal position with respect to the traveling direction, to a second position for traveling curves, in which the sweeping element axis of the sweeping element is moved into a position pivoted towards the inner side of the curve.

The present invention provides a sweeping machine, wherein, in the operating position, the sweeping element is in contact with the ground and sweeps the same, wherein, in the operating position, the sweeping element axis is coupled with the wheel axle so that the sweeping element can be driven by rotation of the wheel axle, wherein the sweeping element is adapted to be pivoted to a transport position in which the sweeping element does not contact the ground, wherein, in the transport position, the wheel axle and the sweeping element axis are decoupled from each other so that the sweeping element is not driven while in the transport position.

By pivoting the sweeping element from the operating position to the transport position, the wheel axle and the sweeping element axis can be decoupled from each other.

By pivoting the sweeping element from the transport position to the operating position, the wheel axle and the sweeping element axis can be coupled with each other.

The wheel axle and the sweeping element axis may be adapted to be coupled via a transmission, in particular via a belt drive or a chain drive.

A clutch may be provided that decouples the wheel axle from the sweeping element axis.

The clutch may be actuated using a cable pull when pivoting the sweeping element from the operating position to the transport position and vice versa.

Further, the present invention may provide another method for sweeping ground surfaces, in particular lawns, wherein a vehicle moves a sweeping machine in the traveling direction, wherein the sweeping machine is supported by at least one wheel on a wheel axle of the sweeping machine that extends transversely to the traveling direction, and wherein the ground surface is swept with at least one sweeping element extending substantially parallel to the wheel axle and driven to rotate about a sweeping element axis, and wherein, in an operating position in which the sweeping element is in contact with the ground, the sweeping element axis is coupled with the wheel axle and is driven by rotation of the wheel axle. In this method it may advantageously be provided that the sweeping element is pivoted from an operating position to a transport position in which the sweeping element does not contact the ground, wherein the pivoting to the transport position causes the wheel axle and the sweeping element axis to become decoupled from each other so that the sweeping element is not driven in the transport position.

When pivoting the sweeping element from the transport position to an operating position, the pivoting causes the wheel axle and the sweeping element axis to be coupled.

The following is a detailed description of an embodiment of the invention with reference to the drawings.

Figure 2:
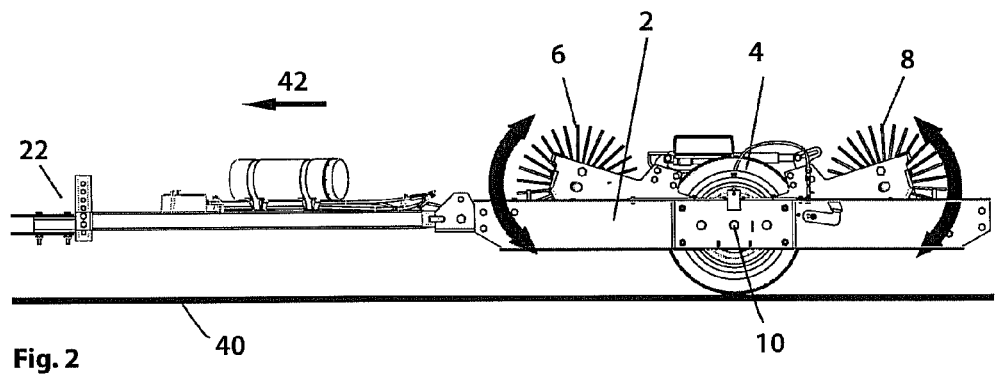
Figure 3:
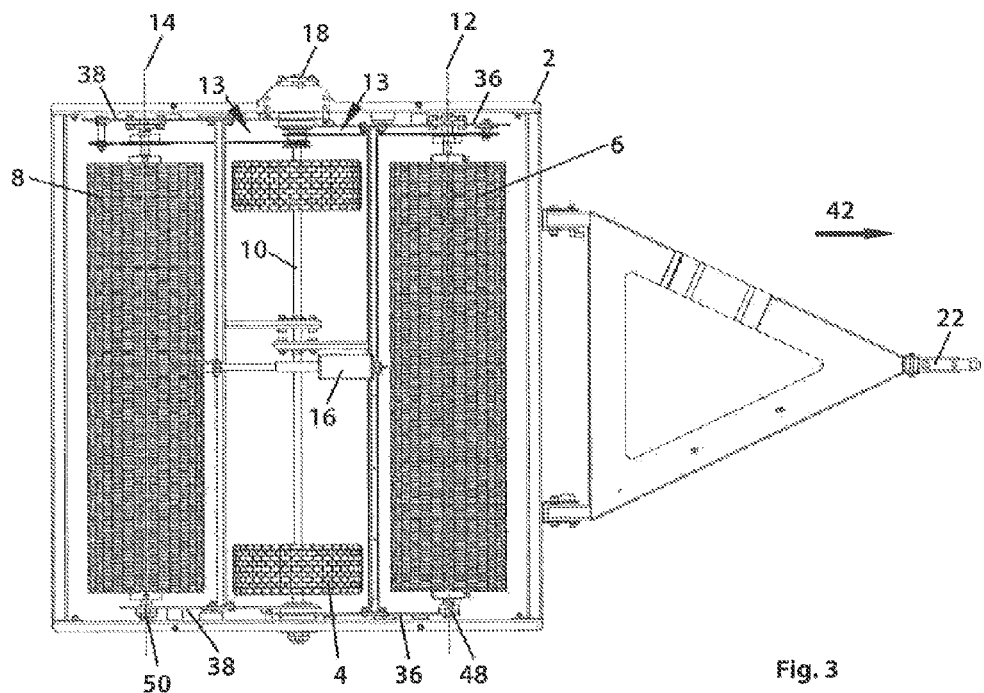
Figure 4:
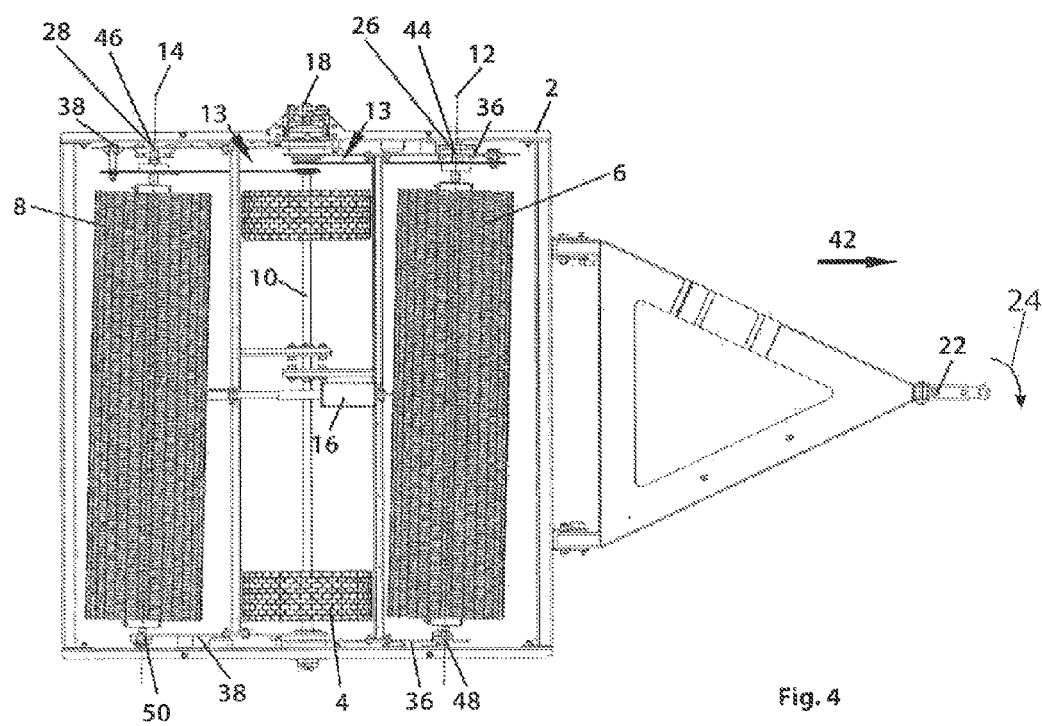
Figure 5:
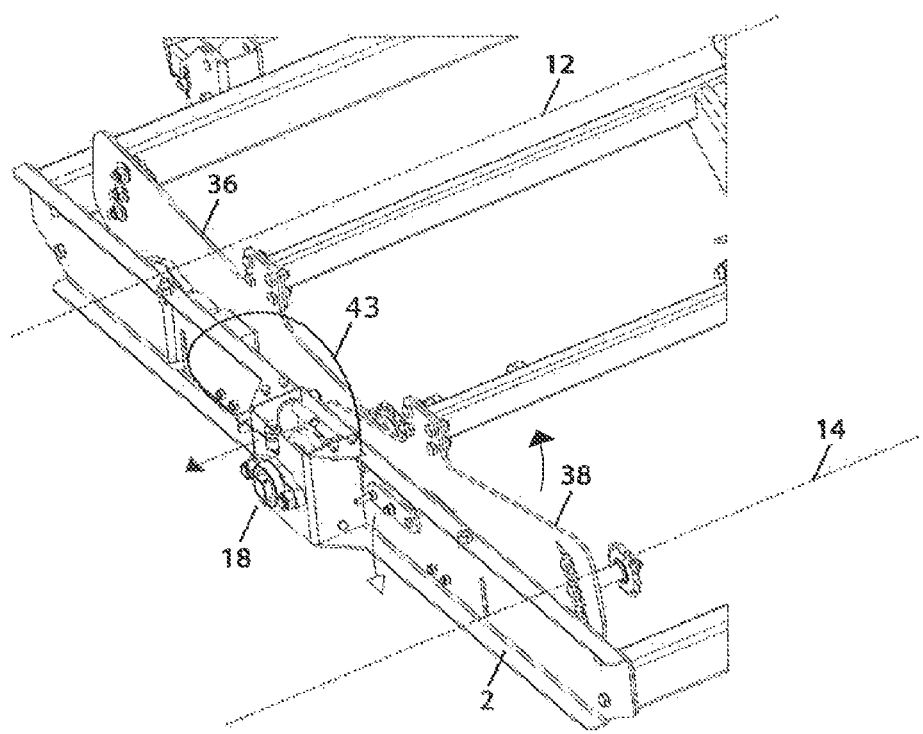
Figure 6:
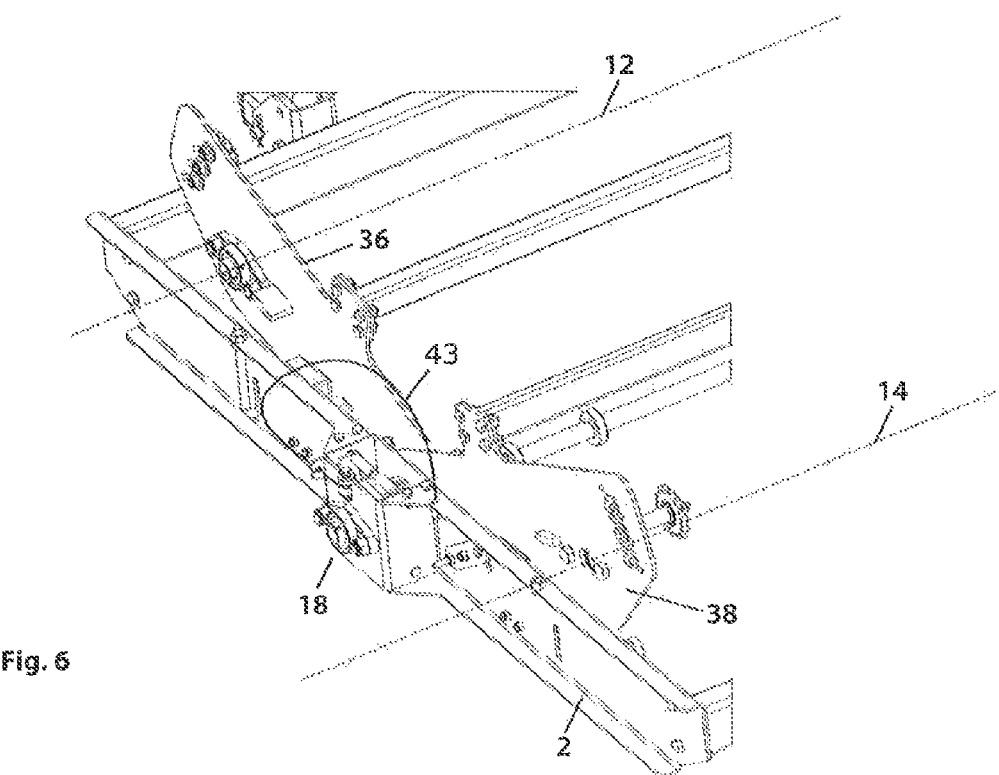
Figure 7:
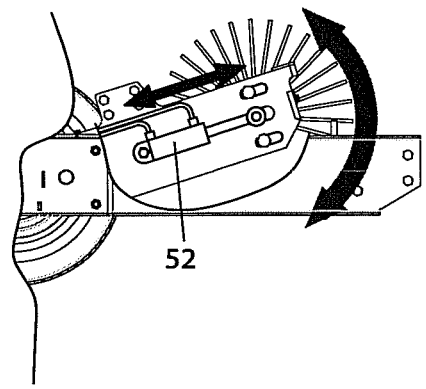
Figure 8:
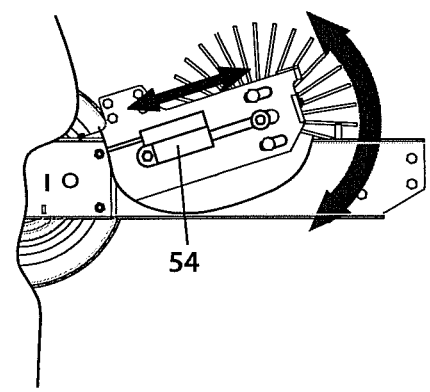
Figure 9:
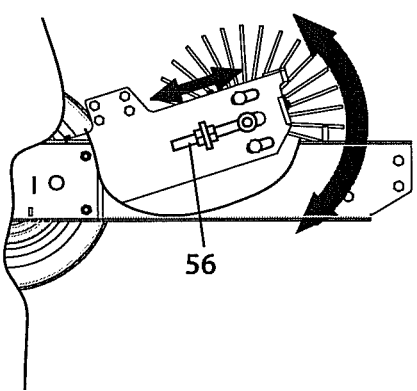

The Figures schematically show:

FIG. 1 a sweeping machine in side elevational view,

FIG. 2 the sweeping machine of FIG. 1 in the transport position,

FIG. 3 a top plan view on the sweeping machine,

FIG. 4 the sweeping machine in the second operating position,

FIG. 5 the machine frame of the sweeping machine,

FIG. 6 the machine frame of the sweeping machine in the transport position,

FIG. 7 a hydraulic adjusting means for pivoting the sweeping element from the first to the second operating position, FIG. 8 an electric adjusting means, FIG. 9 a manual adjusting means.

FIG. 1 illustrates a sweeping machine 1 for working a ground surface 40. The sweeping machine 1 can be pulled in the traveling direction 42 using a towing vehicle not illustrated herein. A coupling device 22 is provided for the towing vehicle.

The sweeping machine illustrated comprises a machine frame 2 adapted to be moved in the traveling direction 42 by means of the towing vehicle. A wheel axle 10 with two wheels 4 is supported in the machine frame 2. The wheel axle 10 extends substantially parallel to the ground surface 40. The wheel axle 10 supports the machine frame 2 substantially parallel to the ground surface 40. When the sweeping machine is moved in the traveling direction 42, wheels 4 are rotated. The rotation of the wheels 4 drives the wheel axle 10.

The sweeping machine preferably comprises two sweeping elements 6, 8 adapted to be rotated about a respective sweeping element axis 12, 14. The sweeping elements 6, 8 are brush rollers. The sweeping element axes 12, 14 substantially extend parallel to the ground surface 40. In FIG. 1, the sweeping elements are illustrated in an operating position in which the sweeping elements are in contact with the ground surface 40 and sweep the ground surface 40. The sweeping elements 6, 8 preferably rotate in a direction opposite to the rotation of the wheels 4. Alternatively, the sweeping elements 6, 8 may also rotate in the same direction as the wheels 4.

In the operating position, the sweeping element axes 12 and 14 are coupled with the wheel axle 10. This is illustrated in FIG. 3. In the case illustrated, the coupling may be effected through transmissions 13, preferably chain drives or belt drives. In the embodiment illustrated, the transmissions 13 are chain drives. The sweeping element axes 12, 14, and thus the sweeping elements 6 and 8, can be driven by the rotation of the wheel axle 10 and the wheels 4.

Using a piston/cylinder element 16, the sweeping elements 6 and 8 can be pivoted to a transport position. FIG. 2 illustrates the sweeping elements 6 and 8 in the transport position. In the transport position the sweeping elements 6 and 8 do not contact the ground surface 40, and the wheel axle 10 and the sweeping element axes 12 and 14 are decoupled from each other in the transport position so that the sweeping elements 6 and 8 are not driven in the transport position. Pivoting the sweeping elements 6, 8 from the operating position to the transport position causes the wheel axle 10 and the sweeping element axes 12, 14 to be decoupled from each other. This is achieved by means of the clutch 18.

The pivoting from the operating position to the transport position and the decoupling will be described with reference to FIGS. 5 and 6. FIGS. 5 and 6 show only a part of the machine frame 2. The machine frame 2 comprises inner frame elements 36, 38. The sweeping elements 6, 8 are respectively supported on either side in one of the inner frame elements 36, 38 by the sweeping element axes 12, 14. The inner frame elements 36, 38 are arranged at both ends of the sweeping element axes 12, 14. The inner frame elements 36, 38 may be pivoted about a pivot axis extending parallel to the wheel axle or about the wheel axle 10.

When pivoting the inner frame elements 36, 38, a cable pull element 43 can be actuated as in the embodiment illustrated, which cable pull element actuates the clutch 18 and disengages the wheel axle 10 from the sweeping element axes 12, 14. Upon pivoting from the operating position to the transport position, i.e. upon pivoting upward, the wheel axle 10 is disengaged from the sweeping element axes 12, 14 via the clutch 18. Upon pivoting from the transport position to the operating position, i.e. upon pivoting downward, the wheel axle 10 is again coupled with the sweeping element axes 12, 14. This means that the sweeping elements 6, 8 are not driven in the transport position, whereas in the operating position, in which the sweeping elements 6, 8 sweep the ground surface 40, they are driven by the wheel axle 10.

FIG. 3 illustrates the sweeping machine 1 in top plan view. In FIG. 3 the sweeping machine is shown in a first operating position. In this first operating position the sweeping element axes 12 and 14 are arranged parallel to the wheel axle 10 and, when traveling straight, they are arranged orthogonally to the travelling direction 42.

When driving a curve, the sweeping element axes 12, 14 of the sweeping elements 6, 8 can be moved to a second operating position in which they assume a position pivoted towards the inner side of the curve. The second operating position is illustrated in FIG. 4. The sweeping element axes 12, 14 have been moved to a position pivoted towards the inner side of the curve. The direction of curve travel is indicated by the reference numeral 24. The sweeping element axes are preferably pivoted around a substantially vertical pivot axis from the first operating position to the second operating position.

The sweeping element axes 12, 14 each have a first end 44, 46 and a respective second end 48, 50, which are supported in the inner frame elements 36, 38 of the machine frame 2. The fact that the sweeping element axes 12, 14 are pivoted towards the inner side of the curve means that the sweeping elements 6, 8 are turned more in the direction of the curve. In other words, the end at outer side of the curve is pivoted forward with respect to the traveling direction and/or the end at the inner side of the curve is pivoted rearward with respect to the traveling direction.

In order to pivot the sweeping element axes 12, 14, the sweeping element axes 12, 14 of the sweeping elements 6, 8 may be adjustable at the first end 44, 46 and/or at a second end 48, 50 relative to the machine frame 2 by means of an adjusting means. In the embodiment illustrated the sweeping element axes 12, 14 are adjusted in the inner frame elements 36, 38 at the respective second end 48, 50 relative to the machine frame 2 so that the sweeping elements 6, 8 are pivoted about a pivot axis 26, 28 respectively extending in the first end 44, 46. The pivot axes 26, 28 preferably extend substantially vertically, i.e. substantially orthogonally to the ground surface 40.

FIGS. 7 to 9 illustrate different adjusting means 52, 54, 56 for pivoting the sweeping element axes 12, 14. FIG. 7 illustrates a hydraulic adjusting means 52. FIG. 8 illustrates an electric adjusting means and FIG. 9 illustrates a manual adjusting means.

The sweeping elements 6 and 8 can be moved from the first operating position to the second operating position when driving a curve. As an alternative, the sweeping elements 6, 8 may also be moved from the first operating position to the transport position first. Thereafter, the adjusting means 52, 54, 56 can be actuated and the sweeping element axes 12, 4 can be adjusted with respect to frame elements 36, 38 of the machine frame 2. The sweeping elements 6, 8 may then be lowered to the operating position again, the adjustment of the sweeping element axes 12, 14 causes the sweeping elements 6, 8 to be moved to the second operating position as they are lowered, with the sweeping elements 6,8 assuming a position pivoted to the inner side of the curve.

The invention claimed is:

1. A sweeping machine for working ground surfaces, comprising:
   a machine frame adapted to be moved in a traveling direction,
   at least one wheel axle with at least one wheel, said wheel axle being supported in the machine frame transversely to the traveling direction, said wheel axle supporting the machine frame parallel to the ground surface,
   at least two sweeping elements are provided, one sweeping element being arranged ahead of the at least one wheel axle and one sweeping element being arranged behind the at least one wheel axle, seen in the traveling direction each sweeping element is adapted to be driven for rotation about a respective sweeping element axis, each sweeping element axis extending substantially parallel to the ground surface, and each sweeping element about its respective sweeping element axis is in contact with the ground surface when in an operating position,
   wherein
   the sweeping element axis of each sweeping element is adapted to be moved from a first operating position, assumed when travelling straight, to a second operating position, assumed when driving a curve, in which second position the sweeping element axis is in a position pivoted towards the inner side of the curve.

2. The sweeping machine according to claim 1, wherein the at least two sweeping elements are brush rollers.

3. The sweeping machine according to claim 1, wherein a single wheel axle is provided which is supported in the machine frame.

4. The sweeping machine according to claim 1, wherein at least one wheel axle drives said at least two sweeping elements or a transmission.

5. The sweeping machine according to claim 1, wherein in the first operating position, each sweeping element axis is arranged parallel to the at least one wheel axle.

6. The sweeping machine according to claim 1, wherein each sweeping element axis is pivotable from the first operating position to the second operating position about a substantially vertical pivot axis.

7. The sweeping machine according to claim 6, wherein the vertical pivot axis extends through a bearing at at least one free end of each sweeping element axis.

8. The sweeping machine according to claim 1, wherein each sweeping element axis is pivotable substantially in a plane parallel to the ground surface.

9. The sweeping machine according to claim 1, wherein each sweeping element axis has a first and a second supported end, at least one end being adjustable with respect to the machine frame by means of an adjusting means in order to pivot the sweeping element axis.

10. The sweeping machine according to claim 9, wherein the adjusting means is adapted to be actuated manually, pneumatically or hydraulically.

11. The sweeping machine according to claim 9, wherein the adjusting means for each sweeping element axis may be controllable in an automatic manner depending on the steering angle of a towing vehicle or on a curve travel detector signal from a detector provided on the machine frame.

12. The sweeping machine according to claim 1, wherein when driving a curve, a first end of each of the at least two sweeping elements, situated on the outer side of the curve, is adapted to be adjusted forward with respect to the frame, seen in the traveling direction, a second end of each of the at least two sweeping elements, situated on the inner side of the curve, is adapted to be adjusted rearward with respect to the frame.

13. The sweeping machine according to claim 1, wherein each sweeping element axis is supported in an inner frame element of the machine frame, which is vertically adjustable with respect to the machine frame such that each respective sweeping element can be moved to a transport position in which the sweeping element is not in contact with the ground surface.

14. The sweeping machine according to claim 1, wherein in the first and second operating position, each sweeping element is drivingly coupled with the wheel axle via a transmission, while in a transport position, each sweeping element is adapted to be uncoupled from the wheel axle by means of a clutch.

15. A sweeping machine adapted to be pulled by a towing vehicle, for sweeping a ground, comprising:
   a machine frame,
   at least two wheels adapted to rotate about at least one wheel axle,
   at least two sweeping elements are provided one sweeping element being arranged ahead of the at least one wheel axle and one sweeping element being arranged behind the at least one wheel axle, seen in a traveling direction,
   wherein the sweeping elements are adapted to rotate about respective sweeping element axes, the sweeping elements being in contact with the ground, when in its operating position, and sweep the ground, the respective sweeping element axes in the operating position being coupled with the at least one wheel axle so that the sweeping elements can be driven by the rotation of the at least one wheel axle,
   wherein
   the at least two sweeping elements are adapted to be pivoted to a transport position in which the at least two sweeping elements do not contact the ground, the at least one wheel axle and the respective sweeping element axes being decoupled from each other in the transport position so that the at least two sweeping elements are not driven in the transport position.

16. The sweeping machine according to claim 15, wherein the at least one wheel axle and the sweeping element axes are adapted to be decoupled from each other by pivoting the at least two sweeping elements from the operating position to the transport position.

17. The sweeping machine according to claim 15, wherein the at least one wheel axle and the sweeping element axes are adapted to be coupled with each other by pivoting the at least two sweeping elements from the transport position to the operating position.

18. The sweeping machine according to claim 15, wherein the at least one wheel axle and the sweeping element axes are adapted to be coupled via a transmission.

19. The sweeping machine according to claim 15, wherein a clutch is provided that decouples the at least one wheel axle from the respective sweeping element axes.

* * * * *